(12) United States Patent
Wiseman et al.

(10) Patent No.: US 8,885,828 B2
(45) Date of Patent: Nov. 11, 2014

(54) MULTI-COMMUNITY NETWORK WITH QUANTUM KEY DISTRIBUTION

(75) Inventors: Simon Robert Wiseman, Malvern (GB); Brian Sinclair Lowans, Malvern (GB); Richard Andrew Oak, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 12/812,849

(22) PCT Filed: Jan. 23, 2009

(86) PCT No.: PCT/GB2009/000190
§ 371 (c)(1),
(2), (4) Date: Jul. 14, 2010

(87) PCT Pub. No.: WO2009/093037
PCT Pub. Date: Jul. 30, 2009

(65) Prior Publication Data
US 2010/0329459 A1    Dec. 30, 2010

Related U.S. Application Data

(60) Provisional application No. 61/023,558, filed on Jan. 25, 2008.

(30) Foreign Application Priority Data

Jan. 25, 2008 (GB) .................................. 0801408.6

(51) Int. Cl.
| | |
|---|---|
| *H04L 29/06* | (2006.01) |
| *H04L 9/08* | (2006.01) |
| *H04L 9/06* | (2006.01) |
| *H04B 10/70* | (2013.01) |

(52) U.S. Cl.
CPC .............. *H04B 10/70* (2013.01); *H04L 9/0805* (2013.01); *H04L 9/0833* (2013.01); *H04L 9/065* (2013.01); *H04L 9/0855* (2013.01); *H04L 9/0883* (2013.01)
USPC ........................................ 380/256; 380/278

(58) Field of Classification Search
CPC ... H04L 9/0855; H04L 9/0883; H04L 9/0833; H04L 9/0805; H04L 9/065
USPC .................................................. 380/256, 278
See application file for complete search history.

(56) References Cited

U.S. PATENT DOCUMENTS

| | | |
|---|---|---|
| 3,704,996 A | 12/1972 | Borner et al. |
| 4,291,939 A | 9/1981 | Giallorenzi et al. |

(Continued)

FOREIGN PATENT DOCUMENTS

| | | |
|---|---|---|
| EP | 0 583 115 A1 | 2/1994 |
| EP | 0 610 727 A1 | 8/1994 |

(Continued)

OTHER PUBLICATIONS

Kumavor et al., "Comparison of four multi-user quantum key distribution schemes over passive optical networks," Proc. of Optical Fiber Communication Conference, 2004, vol. 1, pp. 205-207.

(Continued)

*Primary Examiner* — Hadi Armouche
*Assistant Examiner* — Hee Song
(74) *Attorney, Agent, or Firm* — Oliff PLC

(57) ABSTRACT

This invention relates to an optical star network in which different communities of users, such as different businesses, are provided through use of quantum key distribution (QKD). At least one QKD device is located at the central hub of the star network and communicates with QKD devices at the endpoints to establish a separate quantum key, i.e. a cryptographic key established by QKD, with each endpoint. A separate key manager is provided for each different community and each key manager is arranged to use the appropriate quantum keys for endpoints within that community to deliver the same community key to each endpoint. This community key can be used by for encrypting network traffic between members of the same community with security. Traffic passing through the network switch is encrypted, but the community keys are not delivered via the switch and hence the switch an error in the switch does not compromise security.

14 Claims, 2 Drawing Sheets

(56) References Cited

U.S. PATENT DOCUMENTS

| | | | |
|---|---|---|---|
| 4,475,971 A | 10/1984 | Canterino | |
| 4,691,984 A | 9/1987 | Thaniyavarn | |
| 4,807,952 A | 2/1989 | Jaeger et al. | |
| 4,846,540 A | 7/1989 | Kapon | |
| 5,150,436 A | 9/1992 | Jaeger et al. | |
| 5,157,754 A | 10/1992 | Bierlein et al. | |
| 5,166,991 A | 11/1992 | Jaeger et al. | |
| 5,410,625 A | 4/1995 | Jenkins et al. | |
| 5,414,789 A | 5/1995 | Tamil et al. | |
| 5,428,698 A | 6/1995 | Jenkins et al. | |
| 5,479,514 A | 12/1995 | Klonowski | |
| 5,481,636 A | 1/1996 | Fukuda et al. | |
| 5,566,257 A | 10/1996 | Jaeger et al. | |
| 5,644,664 A | 7/1997 | Burns et al. | |
| 5,757,912 A | 5/1998 | Blow | |
| 5,768,378 A * | 6/1998 | Townsend et al. | 380/256 |
| 5,878,142 A | 3/1999 | Caputo et al. | |
| 5,999,548 A | 12/1999 | Mori et al. | |
| 6,028,935 A | 2/2000 | Rarity et al. | |
| 6,145,079 A | 11/2000 | Mitty et al. | |
| 6,240,514 B1 | 5/2001 | Inoue et al. | |
| 6,717,708 B2 | 4/2004 | Prosyk | |
| 6,798,795 B2 | 9/2004 | Yoo | |
| 6,806,986 B2 | 10/2004 | Asobe et al. | |
| 7,068,790 B1 | 6/2006 | Elliot | |
| 7,155,078 B2 | 12/2006 | Welch et al. | |
| 7,162,107 B2 | 1/2007 | Bull et al. | |
| 7,181,114 B2 | 2/2007 | Lee et al. | |
| 7,242,775 B2 | 7/2007 | Vig et al. | |
| 7,242,821 B2 | 7/2007 | Bull et al. | |
| 7,248,695 B1 | 7/2007 | Beal et al. | |
| 7,274,791 B2 | 9/2007 | Van Enk | |
| 7,289,688 B2 | 10/2007 | Bull et al. | |
| 7,430,295 B1 * | 9/2008 | Pearson et al. | 380/256 |
| 7,457,416 B1 * | 11/2008 | Elliott | 380/256 |
| 7,460,670 B1 | 12/2008 | Elliott | |
| 7,515,716 B1 | 4/2009 | Elliott | |
| 7,515,801 B2 | 4/2009 | McCaughan et al. | |
| 7,596,318 B2 | 9/2009 | Han et al. | |
| 7,627,126 B1 | 12/2009 | Pikalo et al. | |
| 7,646,873 B2 | 1/2010 | Lee et al. | |
| 7,706,535 B1 | 4/2010 | Pearson et al. | |
| 7,760,883 B2 | 7/2010 | Kuang | |
| 7,864,958 B2 | 1/2011 | Harrison et al. | |
| 7,865,048 B2 | 1/2011 | McCaughan et al. | |
| 8,054,976 B2 | 11/2011 | Harrison et al. | |
| 8,488,790 B2 | 7/2013 | Wellbrock et al. | |
| 2002/0025046 A1 | 2/2002 | Lin | |
| 2002/0087862 A1 | 7/2002 | Jain et al. | |
| 2003/0210912 A1 | 11/2003 | Leuthold et al. | |
| 2003/0214991 A1 | 11/2003 | Wiedmann et al. | |
| 2004/0032954 A1 | 2/2004 | Bonfrate et al. | |
| 2004/0034776 A1 | 2/2004 | Fernando et al. | |
| 2004/0109564 A1 | 6/2004 | Cerf et al. | |
| 2004/0184603 A1 | 9/2004 | Pearson et al. | |
| 2004/0184615 A1 | 9/2004 | Elliott et al. | |
| 2004/0252957 A1 | 12/2004 | Schmidt et al. | |
| 2005/0078826 A1 | 4/2005 | Takeuchi | |
| 2005/0135620 A1 | 6/2005 | Kastella et al. | |
| 2005/0190921 A1 | 9/2005 | Schlafer et al. | |
| 2005/0249352 A1 | 11/2005 | Choi et al. | |
| 2005/0259825 A1 | 11/2005 | Trifonov | |
| 2005/0286723 A1 | 12/2005 | Vig et al. | |
| 2006/0002563 A1 | 1/2006 | Bussieres et al. | |
| 2006/0031828 A1 | 2/2006 | Won et al. | |
| 2006/0059343 A1 | 3/2006 | Berzanskis et al. | |
| 2006/0062392 A1 | 3/2006 | Lee et al. | |
| 2006/0067603 A1 | 3/2006 | Bull et al. | |
| 2006/0083379 A1 | 4/2006 | Brookner | |
| 2006/0290941 A1 | 12/2006 | Kesler et al. | |
| 2007/0014415 A1 | 1/2007 | Harrison et al. | |
| 2007/0016534 A1 | 1/2007 | Harrison et al. | |
| 2007/0065154 A1 | 3/2007 | Luo et al. | |
| 2007/0065155 A1 | 3/2007 | Luo et al. | |
| 2007/0071245 A1 | 3/2007 | Kuang | |
| 2007/0074277 A1 | 3/2007 | Tofts et al. | |
| 2007/0076884 A1 | 4/2007 | Wellbrock et al. | |
| 2007/0101410 A1 | 5/2007 | Harrison et al. | |
| 2007/0104443 A1 | 5/2007 | Helmy | |
| 2007/0122097 A1 | 5/2007 | Schmidt et al. | |
| 2007/0123869 A1 | 5/2007 | Chin et al. | |
| 2007/0130455 A1 * | 6/2007 | Elliott | 713/150 |
| 2007/0133798 A1 | 6/2007 | Elliott | |
| 2007/0160201 A1 | 7/2007 | Blom et al. | |
| 2007/0177735 A1 | 8/2007 | Mimih et al. | |
| 2007/0192598 A1 | 8/2007 | Troxel et al. | |
| 2008/0003104 A1 | 1/2008 | Betlach | |
| 2008/0013738 A1 * | 1/2008 | Tajima et al. | 380/278 |
| 2008/0031456 A1 | 2/2008 | Harrison et al. | |
| 2008/0144836 A1 | 6/2008 | Sanders et al. | |
| 2008/0147820 A1 | 6/2008 | Maeda et al. | |
| 2008/0175385 A1 | 7/2008 | Lee et al. | |
| 2008/0292095 A1 | 11/2008 | Vig et al. | |
| 2008/0317423 A1 | 12/2008 | Stepanov et al. | |
| 2009/0016736 A1 | 1/2009 | Beal et al. | |
| 2009/0074192 A1 | 3/2009 | Beal et al. | |
| 2009/0106551 A1 | 4/2009 | Boren et al. | |
| 2009/0175452 A1 * | 7/2009 | Gelfond et al. | 380/277 |
| 2009/0316910 A1 | 12/2009 | Maeda et al. | |
| 2010/0098252 A1 * | 4/2010 | Kanter et al. | 380/256 |
| 2010/0226659 A1 | 9/2010 | Nishioka et al. | |
| 2010/0290626 A1 | 11/2010 | Jenkins et al. | |
| 2010/0293380 A1 | 11/2010 | Wiseman et al. | |
| 2010/0299526 A1 | 11/2010 | Wiseman | |

FOREIGN PATENT DOCUMENTS

| | | |
|---|---|---|
| EP | 1 503 328 A1 | 2/2005 |
| EP | 2 081 317 A2 | 7/2005 |
| EP | 1 605 287 A2 | 12/2005 |
| EP | 1 633 076 A1 | 3/2006 |
| EP | 1 643 663 A1 | 5/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 A | 9/2005 |
| JP | A-2007-500370 A | 1/2007 |
| JP | A-2007-053591 | 3/2007 |
| JP | A-2007-129562 | 5/2007 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/095644 A1 | 8/2009 |
| WO | WO 2009/141586 A1 | 11/2009 |

(56) References Cited

FOREIGN PATENT DOCUMENTS

| WO | WO 2009/141587 A1 | 11/2009 |
|---|---|---|
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Menezes et al., "Handbook of Applied Cryptography," 1997, pp. 547-553, XP-002520285.
Kuhn, "A Quantum Cryptographic Protocal with Detection of Compromised Server," *Quantum Information and Computation*, 2005, vol. 5, No. 7, pp. 551-560, XP-002520284.
British Search Report in British Patent Application No. GB0801408.6; dated May 16, 2008.
Written Opinion of the International Searching Authority in International Application No. PCT/GB2009/000190; dated Mar. 31, 2009.
International Search Report issued in International Application No. PCT/GB2009/000190; dated Mar. 31, 2009.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Stucki et al. "Quantum Key Distribution Over 67km with a Plug and Play System," New Journal of Physics 4, pp. 41.1-41.8, 2002.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
May 16, 2008 Search Report issued in International Application No. GB0801408.6.
Apr. 24, 2008 Search Report issued in International Application No. GB0801492.0.
May 21, 2008 Search Report issued in International Application No. GB0801395.5.
May 21, 2008 Search Report issued in International Application No. GB0801406.0.
Aug. 31, 2008 Search Report issued in International Application No. GB0801406.0.
Sep. 2, 2008 Search Report issued in International Application No. GB0801406.0.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Jun. 21, 2012 Office Action issued in U.S. Appl. No. 12/863,510.
Aug. 15, 2012 Office Action issued in U.S. Appl. No. 12/863,483.
Aug. 1, 2012 Office Action issued in U.S. Appl. No. 12/993,098.
U.S. Appl. No. 13/496,324 in the name of Ayling, filed Mar. 15, 2012.
U.S. Appl. No. 12/863,509 in the name of Jenkins, filed Jul. 19, 2010.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,483 in the name of Wiseman, filed Jul. 19, 2010.
Sep. 12, 2012 Office Action issued in U.S. Appl. No. 12/863,509.
Oct. 4, 2012 Office Action issued in U.S. Appl. No. 12/992,695.
Oct. 29, 2012 Office Action issued in U.S. Appl. No. 12/993,146.
Nov. 8, 2012 Office Action issued in U.S. Appl. No. 12/863,510.
Nov. 9, 2012 Office Action issued in U.S. Appl. No. 13/130,790.
Rass, S., "A Method of Authentication for Quantum Networks", PWASET, vol. 12, Mar. 2006; ISSN 1307-6884, pp. 149-154.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
English translation of Apr. 30, 2013 Office Action issued in Japanese Patent Application No. 2010-543567.
Ibrahim et al. "Simulation of Static Optical XPM in Active MMI Couplers" (published in International Conference on Numerical Simulation of Optoelectronic Devices, Sep. 2007).
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Jan. 17, 2014 Notice of Allowance issued in U.S. Appl. No. 13/130,944.
Feb. 19, 2014 Notice of Allowance issued in U.S. Appl. No. 12/992,695.
Fung, Chi-hang Fred et al. "Security proof of quantum key distribution with detection efficiency mismatch," Jan. 2009, pp. 131-165, vol. 9, No. 1&2, Rinton Press.
Aug. 29, 2013 Office Action issued in U.S. Appl. No. 12/992,695.
Sep. 12, 2013 Office Action issued in U.S. Appl. No. 13/130,897.
Nov. 5, 2013 Office Action issued in U.S. Appl. No. 12/863,510.
Nov. 7, 2013 Office Action issued in U.S. Appl. No. 12/993,098.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any Two Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "Three Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure des Telecommunications, Eurocontrol CARE Project, QCRYPT, France, 2006.
Lütkenhaus, "Estimates for Practical Quantum Cryptography," Helsinki Institute of Physics, Feb. 1, 2008, pp. 1-26, Helsinki, Finland.

(56) References Cited

OTHER PUBLICATIONS

Mar. 25, 2014 Office Action issued in U.S. Appl. No. 12/863,509.
John P. Barber; Integrated hollow and solid-core waveguides for sensor platforms; Year:2005; OSA/IPRA; p. 1-3.
Bechmann-Pasquinucci et al., "Quantum key distribution with trusted quantum relay," May 12, 2005, pp. 1-13, <http://arxiv.org/PS_cache/quant-ph/pdf/0505/0505089v1.pdf.
Bennett et al., "Quantum Cryptography: Public Key Distribution and Coin Tossing," International Conference on Computers, Systems & Signal Processing, Dec. 10-12, 1984, pp. 1-5, Bangalore, India.
Duligall et al., "Low cost and compact quantum key distribution," New Journal of Physics 8, 249, pp. 116, 2006.
Elliott, "Building the quantum network," New Journal of Physics 4, pp. 46.1-46.12, 2002, XP-002271991.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to Gigahertz-Clocked Multiuser Quantum Key Distribution," Journal of Quantum Electronics, vol. 43, No. 2, pp. 130-138, Feb. 2007.
Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep 1 &type=pdf>, Jan. 2003.
Gordeev et al., "Tunable elect-optic polarization modulator for quantum key distribution applicators," Optics Communications, vol. 234, pp. 203-210, 2004.
Horikiri et al., "Quantum key distribution with a heralded single photon source," International Quantum Electronics Conference, 2005, pp. 1617-1618, Jul. 11, 2005.
Lee et al., "Quantum Authentication and Quantum Key Distribution Protocol," Jan. 11, 2006,pp. 1-8, <http://arxiv.org/PS_cache/quant-ph/pdf/0510/0510144v2.pdf>.
Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.
Karlsson et al., "Authority-based user authentication in quantum key distribution," Physical Review A, vol. 62, pp. 022305-1-022305-7, 2000, XP-002534291.
Malis et al., "Improvement of second-harmonic generation in quantum-cascade lasers with true phase matching," Applied Physics Letters, vol. 84, No. 15, pp. 2721-2723, Apr. 12, 2004.
Mašanović et al., "Design and Performance of a Monolithically Integrated Widely Tunable AHOptical Wavelength Converter With Independent Phase Control," IEEE Photonics Technology Letters, vol. 196, No. 10, pp. 2299-2301, Oct. 2004.
Nambu et al., "BB84 Quantum Key Distribution System based on Silica-Based Planar Lightwave Circuits," Apr. 22, 2008, pp. 1-11 , <http://arxiv.org/PS_cache/quant-ph/pdf/0404/0404015.pdf>.
Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.
Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.
Nguyen et al., "802.11i Encryption Key Distribution Using Quantum Cryptography," Journal of Networks, vol. 1, No. 5, pp. 9-20, Sep./Oct. 2006, XP-002576733.
Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Jäger et al., "Modal dispersion phase matching over 7 mm length in overdamped polymeric channel waveguides," Applied Physics Letters, vol. 69, No. 27, pp. 4139-4141, Dec. 30, 1996.
Yin et al., "Integrated Arrow waveguides with hollow cores," Optics Express, vol. 12, No. 12, pp. 2710-2715, Jun. 14, 2004, XP-002363659.
Yariv, "Coupled-Mode Theory for Guided-Wave Optics," IEEE Journal of Quantum Electronics, vol. QE-9, No. 9, pp. 919-933, Sep. 1973.
Rahmatian, "An Ultrahigh-Speed AlGaAs-GaAs Polarization Converter Using Slow-Wave Coplanar Electrodes," IEEE Photonics Technology Letters, vol. 10, No. 5, pp. 675-677, May 1998.
Finlayson et al., "Polarization Conversion in Passive Deep-Etched GaAs/AlGaAs Waveguides," Journal of Lightwave Technology, vol. 24, No. 3, pp. 1425-1432, Mar. 2006, XP-002459136.
Grossard et al., "AlGaAs-GaAs Polarization Converter with Electrooptic Phase Mismatch Control," IEEE Photonics Technology Letters, vol. 13, No. 8, pp. 830-832, Aug. 2001.
Hall et al., "Optical Guiding and Electro-Optic Modulation in GaAs Epitaxial Layers," Optics Communications, vol. 1, No. 9, pp. 403-405, Apr. 1970.
Haxha et al., "Analysis of polarization conversion in AlGaAs/GaAs electrooptic polarization converter," Optics Communications, vol. 262, pp. 47-56, 2006, XP-002459135.
Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.
Izuhara et al., "Low-voltage tunable TE/TM converter on ion-sliced lithium niobate thin film," Electronic Letters, vol. 39, No. 15, Jul. 24, 2003.
Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electooptic Waveguide Modulators at λ = 1.3 μm," Journal of Lightwave Technology, vol. 6, No. 6, pp. 758-771, Jun. 1988.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,146, filed Nov. 17, 2010, Hicks.
U.S. Appl. No. 12/993,098, filed Nov. 17, 2010, Wiseman et al.
U.S. Appl. No. 12/992,695, filed Nov. 15, 2010, Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.

* cited by examiner

MULTI-COMMUNITY NETWORK WITH QUANTUM KEY DISTRIBUTION

This invention relates to a communication network having a plurality of different communities each connected to the network and to methods and apparatus for ensuring secure communications within each community using quantum key distribution.

Generally there is a desire for a communication network to allow transfer of data within a particular community whilst ensuring there is no unauthorized or unintentional access to the data from outside the community. For instance the community could be the IT equipment of a particular organization, e.g. user workstations, servers, databases etc. and/or video or voice telephony equipment of that organization. The network should allow user workstations to communicate with one another and with the servers, databases etc. The network may also be connected to a wider network, for instance the internet, through one or more gateways. The use of gateways ensures that traffic to or from the wider network, i.e. outside the community, can be subject to appropriate controls to prevent unauthorized access or unintentional communication outside of the community whereas traffic within the community can be trusted.

One such community network architecture is a switched optical star network. In such an arrangement each endpoint in the network, e.g. each user workstation, server etc is connected via a fibre optic link for optical communication to a single central switch, which may be electrical. Any endpoint can communicate with any other endpoint via the central switch and data is generally sent with a header identifying the switch address the data should be sent to. A gateway to a wider network outside the community can be provided at one endpoint allowing each user in the community to communicate with the outside network via the gateway.

Such an arrangement generally requires each community to have its own switched star network infrastructure. Often different communities of users of communication networks are closely located. For instance different organizations may utilize different floors of the same building. Cost savings could be achieved if the same network infrastructure could be used by different communities—this is especially relevant where the building owner provides the network infrastructure. Also, were a single network infrastructure to be used which could be configured for different communities the costs associated with relocation of the communities, e.g. movement of an organization to a different floor of the building, could potentially be reduced.

Additionally there may be different communities within an organization. For instance there may be levels of sensitivity. A business may, for example, desire to have a communications network for general communications within the business and a separate communications network for communications which have greater sensitivity. The endpoints of the two networks may be geographically dispersed within the environment. For example an office may have several user workstations connected to the general network and also one or more workstations for sensitive communications which is connected to the sensitive network. Again cost savings and greater flexibility may be achieved by having a single network infrastructure rather than separate infrastructures for each separate community.

A single switched star network infrastructure could be used if the switch could be trusted to always direct network traffic from one community only to other members of that community. However errors in reading the correct address or errors in correct routing could result in traffic meant to remain within one community being directed to another community. Thus reliance on the switch introduces risk which may be unacceptable for some applications. An alternative would be to create fibre links from a single switch area to each endpoint but utilize a physically distinct switch for each community. This increases flexibility in changing an endpoint between communities but does require a plurality of switches with the consequent additional expense.

There is also a desire for communications within the network to be secure such that unauthorized access to network traffic, or unintentional communication outside the network, does not reveal the business information. Unauthorized access could be achieved by an eavesdropper tapping undetected into the network to monitor network traffic. Especially in a shared building environment it is not generally possible to guarantee physical security of the network infrastructure and hence eavesdropping must be seen as a risk. Further, as mentioned above, accidental misaddressing of network traffic by a user or incorrect routing by the network infrastructure could result in network traffic being wrongly delivered outside of the network. Encryption can be applied to add security to network traffic.

As will be well understood encryption relies some shared secret, commonly referred to as a key, known only to the sender (typically referred to as Alice) and intended recipient (typically referred to as Bob), in this case the members of the same community. All members of the community may therefore posses the same key; a community key. Any data encrypted using the community key would be unintelligible to an eavesdropper (typically referred to as Eve) or unintended recipient as long as the key remains unknown to Eve or the unintended recipient.

In general the more a particular key is used the easier it is for a codebreaker to determine, hence the key should be changed frequently to maintain security. This requires all members of the community to be provided with a new community key periodically. One way to distribute the key would be to encode it using the existing key before distributing to all members of the community. The new key would then be used for future communications until it is replaced.

One problem with this approach is that if an eavesdropper (Eve) is monitoring the network traffic she could record all the traffic over the network. She could then use all the data sent during a certain small time period, where a single community key is being used, and attempt to decode the traffic and break the encryption. Due to modern encryption techniques this would not be an easy exercise but the eavesdropper may employ various strategies to ease the task and reduce the computation required. If however she was successful in breaking the code at any point she could then start to decode the recorded traffic from that point onwards. This traffic would include, at some point, the new community key which Eve could use to decrypt the subsequent traffic and learn the next key and so on. Thus such a key distribution system, once broken at any point in time fails completely from that point onwards.

Quantum key distribution (QKD) is a known technique to provide key distribution. It allows Alice and Bob to establish a shared secret key and to determine whether there has been any eavesdropping. QKD exploits fundamental principles of quantum mechanics rather than computation complexity and hence can be provably secure even against an eavesdropper with unlimited computing power. Bennet and Brassard described a QKD protocol in C. H. Bennet and G. Brassard, "Quantum cryptography: 'Public key distribution and coin tossing'," IEE Conf. Computers Systems Signal Processing, Bangalore, India 1984 which has become known as the BB84 protocol.

QKD allows a secure distribution of keys between two users in a point to point arrangement, i.e. where there is a single, uninterrupted optical link between Alice and Bob.

British Telecom U.S. Pat. No. 5,768,378 teaches that QKD may also be used to distribute keys between a single sender (Alice) and multiple receivers (Bobs) via a passive optical network. Light sent downstream from the Alice end encounters one or more passive optical network switches which distribute the light between their outputs. In terms of sending single photons for QKD each photon traverses one of the downstream paths at random and ends up at one particular Bob. A wholly passive optical network only allows an endpoint to communicate with the upstream broadcast node, i.e. any Bob can only communicate with Alice and not with another Bob and hence it is not suitable, on its own, for providing a community communication network. A passive optical network can be used as part of a switched star network but the above mentioned problems with trusting the switch to route correctly would apply to the multi-community case.

US patent application US2005/0286723 (Magiq) describes a network having a plurality of relays wherein QKD is used to establish a secure link between each relay. The network may be used purely to distribute a key from Alice to Bob across the network. Thus any endpoint in the network can communicate with any other endpoint and use QKD to secure the links between relays. However this network, when implemented with multiple communities, suffers from the same problem as mentioned above in relation to a star network, namely that it relies on the relays delivering the key to the correct recipient. If, for whatever reason, the relays delivered the message to the wrong recipient it would be transported securely across the network but would be able to be deciphered by the recipient of the incorrect community.

An alternative approach is described in Magiq's published PCT patent application WO2007/123869. Here a number of users are connected to one another by a traditional communication links. In addition users may be connected to a quantum key certificate authority by a quantum link. The quantum links are used for QKD between the certificate authority. Two users wishing to communicate are each then sent the same key by the certificate authority using the respective quantum keys established. Again however such an arrangement relies on the certificate authority providing the key for one community only to members of that authority. The BT patent mentioned above, U.S. Pat. No. 5,768,378 also describes that a central Alice can agree an individual quantum key with each a plurality of Bobs and then distribute traffic keys to a subset of those Bobs which can be used for encrypting data traffic between that subset of Bobs.

BBN Technologies U.S. Pat. No. 7,068,790 teaches that a switched optical network can be enabled incorporating MEMS switches to provide a switchable optical path through a network. In this way an optical path through the network can be established to allow end to end QKD between any two endpoints. Such a switched arrangement does however introduce additional complexity into the network and the QKD apparatus.

It is therefore an object of the present invention to provide a communication network which can reliably and securely operate with more than one different community.

Thus according to the present invention there is provided a switched optical star network having a plurality of distinct user communities, the network comprising a hub and a plurality of endpoints optically connected to the hub wherein the hub comprises a network switch and at least one quantum key distribution device and each endpoint comprises a quantum key distribution device in optical communication with a quantum key distribution device at the hub so as to, in use, derive a quantum key for that endpoint, wherein the hub further comprises a separate key transmitter for each community, each key transmitter being arranged to transmit only to endpoints within the respective community and to transmit to each endpoint in said community a community key encrypted using the quantum key for the particular endpoint.

The present invention enables an optical star network to be used for communication between endpoints, with separate communities being securely and reliably established on a single star network. As in a conventional optical star network each endpoint is optically connected to a single network switch. To communicate between endpoints data is sent optically to the switch along with data identifying the recipient. The switch routes the data to the appropriate output and transmits it to the intended endpoint. As in a conventional switched star network the switch itself may be electrical.

To ensure security each member of a community is provided with a common community key for encrypting traffic over the network. This means only other members of that community can read the traffic. The present invention lies in the use of quantum key distribution to secure links between the hub and each endpoint together with the provision of a separate key transmitter for each community.

Each key transmitter is arranged so that it can only transmit to members of the relevant community. Therefore it is not possible for any endpoint outside of the community to receive the key by accident. The key transmitters do not therefore transmit any information via the network switch—which could accidentally misroute the information. The key transmitters instead make use of the downstream optical links with the appropriate endpoints.

The transmission of the key from the key transmitter to the endpoint is by classical transmission means. The term classical is used herein, as is common in discussion of QKD schemes, to distinguish from the exchange of single photons or entangled qubits on the quantum channel. Classical transmission or classical communication therefore refers to any way of reliably transmitting data, in particular any conventional or standard communication method. The classical transmission from the key transmitter is protected by encrypting it with a key derived by quantum key distribution (QKD). If the QKD is performed correctly the quantum key established is absolutely secure and hence, using the individual quantum key established for any endpoint, the key transmitter can securely transmit the community key to that endpoint.

Compromise of the key transmitter for a community or the hub mounted QKD device(s) would jeopardize security and hence it is important that these devices are physically secure, i.e. not accessible to unauthorized personnel and designed or screened to prevent emissions which could reveal the key data. Preferably therefore each key transmitter is physically secure, for instance located in a tamper proof and/or screened environment and/or provided with various tamper detection devices such as will be known to one skilled in the art. Each hub mounted QKD device is likewise preferably physically secure.

Each endpoint in a community therefore receives the community key. This community key can then be used to encrypt messages sent across the network to another endpoint within the community. The actual message traffic does go via the switch but in the present invention the switch is not trusted with unencrypted data nor with establishing an encrypted link with the correct endpoint. Instead the switch simply directs the encrypted traffic to the relevant endpoint. If the switch operates correctly the recipient will be a member of the same community as the sender and hence will know the common community key and will be able to decrypt the message. Should however the switch deliver the message to the wrong recipient for any reason, and that recipient is not a member of the same community as the sender, they will not have the sender's community key and hence will be unable to decrypt the message.

The present invention therefore allows more than one community to be implemented on a single star network with security and avoids the need to rely on a switch routing correctly or certificate authority correctly identifying members of each community.

As mentioned there is at least one QKD device at the hub and a QKD device at each endpoint. The QKD device at the endpoint is optically connected to a QKD device at the hub. These two QKD devices communicate on a quantum channel. Communication on a classical channel is also required to agree the key as is well known in the art. Conveniently the quantum and classical channels are established as different wavelengths transmitted over the same medium, for instance through a optical fibre. Usually there is a one way transmission on the quantum channel and therefore it is sufficient that one QKD device has a transmitter arrangement suitable of transmitting the necessary signals on the quantum channel and the other QKD device has a receiver arrangement suitable of detecting such signals transmitted on the quantum channel. As used in this specification then the term QKD device refers equally to a device which transmits on the quantum channel or which receives signals on the quantum channel or which does both. Conveniently the QKD devices mounted at the endpoints are all of the same type, i.e. they are all QKD devices incorporating a quantum channel receiver or they are all QKD devices incorporating a quantum channel transmitter. Each QKD device mounted at the hub may therefore comprise the complementary device, i.e. a quantum channel transmitter or quantum channel receiver respectively. However there may be at least one QKD transmitter and at least one QKD receiver at the hub so as to cope with either a quantum channel transmitter or receiver being deployed at an end point. Additionally or alternatively at least one QKD device, whether at the hub or an endpoint, may be capable of acting as both a transmitter and a receiver. With transmitters and receivers at both ends of an optical link two way quantum transmission could be implemented.

Whatever the arrangement of quantum transmitters and receivers, QKD requires two way transmission on the classical channel. Hence each QKD device will either have its own classical transmitter and receiver or be operably connected to a classical transmitter and classical receiver for that optical link.

The QKD devices may be any suitable QKD apparatus and may use any appropriate protocol to establish the quantum key. For instance the QKD devices may use single photon signals modulated in either phase or polarisation and may establish the quantum key along the lines of the BB84 protocol or one of it variants which will be well known to those skilled in the art.

The optical link from the switch to endpoint may comprise an individual, uninterrupted optical link for that endpoint, for example the optical link may comprise a single length of optical fibre. However the link may comprise at least one passive optical switch or 1-to-N splitter allowing several endpoints to share part of the link. As the skilled person will understand classical communications heading downstream, i.e. from the hub to an endpoint, are split at each passive switch or splitter with the same signal going to each downstream output. Each of several endpoints may therefore be connected with their own individual link to a passive optical switch but from the passive switch to the network switch via a common fibre. Downstream communications transmitted through a passive optical switch therefore arrive at each endpoint connected to the passive optical switch. Upstream communications, i.e. communications from an endpoint towards the hub, will always be routed to the network switch. As several endpoints therefore share at least part of the optical link with the hub, only one such endpoint can communicate at any time with a particular upstream wavelength.

It is known that QKD can be applied through a passive optical switch—see for instance BT U.S. Pat. No. 5,768,378. Thus it is possible to have a single QKD device arranged on the shared upstream link to negotiate a separate quantum key with each of the endpoint QKD devices.

Given that the present invention relies on the key transmitter for a particular community only being able to transmit the relevant community key to members of that community it will be apparent that each endpoint connected to a particular passive optical switch should belong to the same community.

A single QKD device could be used at the hub and arranged to transmit to and receive from all optical links at the hub. For instance the quantum channel from each optical link could be separated from the classical channel by wavelength division multiplexing and all the quantum channels combined into a single channel by a 1:N splitter/recombiner, i.e. a passive optical switch. If the hub located QKD device were a quantum transmitter it could send modulated single photons out through the passive optical switch which would be directed randomly to the links to the endpoints. It could then agree a quantum key with each endpoint and provide the quantum keys to key controllers. The key controllers would choose the appropriate quantum keys for the endpoints in the relevant community and use these quantum keys for transmission of the community key. Alternatively the classical communication with the endpoints could be conducted by the relevant key managers so that the key manager establishes the quantum keys with the endpoints itself.

Where there are several endpoints however the use of a single QKD device at the hub may not be sufficient to efficiently communicate with all the endpoints and hence there may be a plurality of QKD devices. In which case preferably each QKD device located at the hub is arranged to only communicate with endpoints within a single community. This improves the separation of the QKD for different communities. Conveniently there may be a QKD device located at the hub for each optical link at the hub. Where each endpoint has its own individual optical link to the hub such an arrangement would clearly result in a separate hub mounted QKD device being dedicated to each endpoint. However, where a single fibre links the hub to a passive optical switch which links to several endpoints, it will be apparent that a single QKD device at the hub connected to the single common fibre communicates with several endpoints.

Each key controller is in communication with the hub located QKD devices relevant for the endpoints within the relevant community. As mentioned above the QKD devices may have their own classical communication apparatus and hence be able to agree a quantum key with each endpoint. In which case the quantum key is transmitted to the key manager for encoding the transmission of the community key on that link. Alternatively the QKD device may simply pass the data relating to photons transmitted or received on the quantum channel to the key manager, which performs the steps of agreeing the quantum key with each endpoint using its own classical communication apparatus.

Each key manager therefore has at least one classical communication apparatus, arranged for downstream communication only—for transmitting the encrypted community key. There may be a separate classical communication apparatus for each relevant optical link. The key manager will generate a random number for the community key, encrypt it with a relevant quantum key for a particular endpoint and then optically transmit it onto the correct optical link for that endpoint.

The present invention therefore has at least three different types of classical communication and one quantum channel communication occurring over each optical link. First there is the quantum signal exchanged by the hub mounted QKD device and the QKD device at an endpoint. There is then a classical exchanges between these QKD devices (or the key manager and endpoint) to discuss the quantum exchange for the purposes of agreeing the quantum key. After a quantum key has been agreed the second type of classical communication is the transfer of the community key from the key transmitter (encoded with the quantum key). The final classic communication type is actual data traffic over the network (encoded with the community key).

As mentioned above the quantum channel is at a different wavelength to the classical channels and the quantum signals are wavelength division multiplexed on the optical link. In addition, some or all of the three different types of classical communication could also occur at different wavelengths. For instance data traffic over the network could occur at a first wavelength or wavelengths. The skilled person will appreciate that it is common in standard optical communication systems to send downstream communications at a different wavelength to upstream communications to avoid problems associated with backscatter noise.

Considering downstream communications only, general data traffic may be sent at a first wavelength. The discussion between the hub mounted QKD device (or key manager) and the endpoint to verify and agree the quantum key may be carried out at a second wavelength and the transmission of the community key at a third wavelength. Alternatively the classical discussion for agreeing the quantum key and subsequent transmission of the community key could both occur at the second wavelength but at different times. Having the classical discussion which is needed for QKD and transmission of the community key at different wavelengths to the data traffic allows such signals to be added to/separated from the optical channel by WDM on the downstream side of the network switch. However it would be possible to use the first wavelength for the data traffic as well as for one or both of the other classical communications with appropriate time division.

The same considerations apply to upstream communications—noting that there are only two types of upstream communication, data traffic and the classical exchange for QKD. The classical transmission of the community key in general only occurs from the key manager to the endpoints and hence is a downstream communication only—although depending on the communication environment used there may be an element of handshaking required, i.e. there may be a need for some communication to go from the endpoint to the key manager in delivery of the community key.

The present invention therefore enables a star network with multiple user communities operating independently and securely.

The invention also relates to the hub architecture and hence, in another aspect of the invention there is provided an optical star network hub apparatus capable of providing multiple communities comprising an optical network switch having a plurality of optical links for optical communication to endpoints, at least one QKD device arranged to operate on said optical links and a separate key transmitter for each community, each key transmitter being connected to a different subset of the optical links and arranged to transmit a community key over said subset of optical links wherein the community key is encrypted using a quantum key derived for that link by the QKD device.

The communities are defined by the endpoints connected to the optical links to which each key transmitter is connected. Or, in other words, the endpoints which belong to a particular community define the subset of optical links to which a key transmitter should be connected.

The present invention also relates to a method of enabling different communities on a shared optical star network. Thus in another aspect of the invention there is provided a method of operating a switched optical star network to provide different communities wherein the network comprises a plurality of endpoints, each endpoint being optically connected to a hub comprising an optical network switch, the method comprising the steps of: using quantum key distribution between the hub and each endpoint to establish a quantum key for each endpoint; transmitting from a first key transmitter at the hub to each endpoint in a first community a first community key encrypted with the relevant quantum key for that endpoint, and transmitting from a second key controller at the hub to each endpoint in a second community a second community key encrypted with the relevant quantum key for that endpoint.

These aspects of the present invention offers all the same advantages and benefits as the first aspect of the invention as described above and all the variations and embodiments described above are application to these aspect of the invention also.

The invention will now be described by way of example only with reference to the following drawings, of which:

Figure 1:
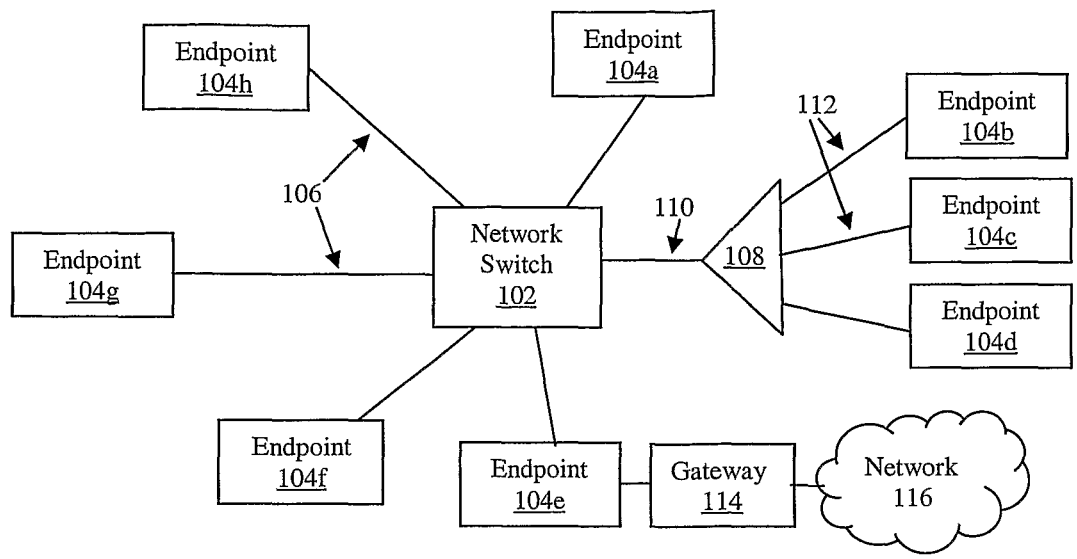
FIG. 1 shows a generalized optical star network.

A basic optical star network arrangement is shown in FIG. 1. A central network switch 102 is connected via fibre optic links 106 to endpoints 104*a-h*. Endpoints 104*a-h* may, for example, comprise desktop PCs, databases, servers and the like and/or telephony equipment or any other communications equipment. Any endpoint wishing to communicate with another endpoint sends the data to the central network switch along with information identifying the destination endpoint. The network switch, which may in general be an electrical switch receives the data, identifies the link for the destination endpoint and retransmits the data on that link.

Several endpoints 104*b-d* may be linked with the central network switch 102 via a passive optical network (PON) switch 108. Such a switch is effectively a 1-to-N way splitter/recombiner. A 1-to-3 way switch is illustrated although in practice PON switches may have many more outputs. Optical data transmitted from the central network switch 102 to any of the endpoints 104*b-d* is transmitted via common fibre optic link 110 to the PON switch 108 where it is split evenly between the fibre links 112 which link the individual endpoints with the PON switch. Thus any data sent from the central switch 102 on fibre link 110 will reach each endpoint 104*b-d*. Data meant for any particular endpoint can be labeled as such so it is only read by the relevant endpoint. Upstream communications, i.e. communication from an endpoint to the central network switch, from any of the endpoints 104*b-d* will output from PON switch 108 on fibre link 110 and thus each of these endpoints can only communicate directly with the switch. Upstream communications from endpoints 104*b-d* are time division multiplexed to avoid interference from one another.

The star network may be linked to other networks, for instance the internet, by arranging one endpoint 104*e* in communication with a gateway 114 to the other network 116. The gateway can interface with the other network and also apply safeguards to communications to/from the other network.

Figure 2:
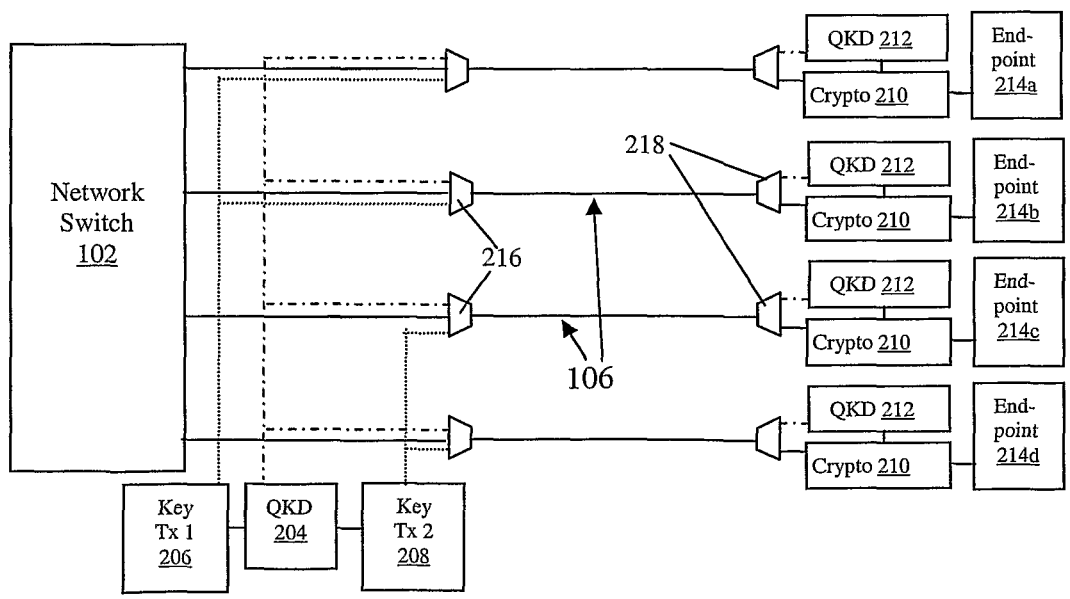
FIG. 2 shows an embodiment of a star network of the present invention.

The present invention extends a switched optical star network architecture to provide multiple communities with secure intra-community communications. One embodiment is shown in FIG. 2. In this embodiment a network switch 102 is again connected to a plurality of endpoints 214*a-d* via fibre optic links 106 as described above. However in this embodiment the endpoints belong to different communities. In the example shown in FIG. 2 endpoints 214*a* and 214*b* belong to a first community and endpoints 214*c* and 214*d* belong to a second community. It will of course be apparent that each community could comprise many more endpoints and there may be more than two communities implemented on the same star network. To provide security for the communications each endpoint 214*a-d* transmits and receives data from the network via a crypto unit 210. Crypto units 210 encrypt messages sent by the endpoint and decrypt message received by the endpoint based on one or more encryption keys. If endpoint 214*a* wishes to communicate with endpoint 214*b*—which is within the same community—it sends the message encrypted with a community key to the central switch along with clear text details of the intended recipient. If the switch operates correctly it receives the encrypted data and recipient details, identifies the correct link and retransmits the encrypted data to endpoint 214*b*. The crypto unit of endpoint 214*b* knows the community key and hence will be able to decrypt the message and thus the user at 214*b* will be able to read the message. Should the central switch fail to route correctly, for whatever reason, the message may be sent to the wrong endpoint, say endpoint 214*c*. In this instance however the message data is still encrypted and, as the crypto unit of endpoint 214*c* does not posses the relevant community key it is unable to decrypt the message.

End to end encryption therefore provides security for the respective communities. It will also be apparent that the message is encrypted throughout its journey on the network and through the switch and hence the network is also protected against eavesdropping.

The community keys need to be updated and distributed from time to time and the present invention uses quantum key distribution (QKD) for key distribution. QKD is a known technique which has been discussed for distributing keys over optical links. QKD relies on one party, usually called Alice, sending to the other party, usually Bob, of quantum signal, such as a series of single photons, each photon being randomly modulated, which is impossible for an eavesdropper to intercept and recreate with certain accuracy. Once the quantum signal has been exchanged Alice and Bob can then discuss what was sent and detected in such a way that they share a secret data value and have confidence it is not known to an eavesdropper.

QKD is however only possible on uninterrupted optical links—hence the endpoints can not perform QKD with one another through the network switch 102. Therefore in the present invention there is at least one QKD device 204 located near the central switch. The QKD device(s) are arranged to transmit or receive a quantum signal over each fibre link 106. The quantum signal operates at a different wavelength from the wavelength used for data traffic over the network and wavelength division multiplexers/demultiplexer 216 are arranged to combine/separate the quantum signal and data traffic sent or received over fibre link 106. Wavelength division multiplexers/demultiplexers combine and separate the signals based on properties of the photons themselves and hence do not interrupt the optical path of the quantum signal.

Each endpoint has a complimentary QKD device, i.e. if the QKD device(s) at the network switch comprises a receiver then each endpoint QKD device comprises a quantum transmitter and vice versa. Each endpoint also has a wavelength division multiplexer/demultiplexer 218 to combine/separate the quantum signal and data traffic.

In operation the QKD devices 204, 210 exchange a quantum signal. The central QKD devices may exchange signals with several endpoint QKD device in parallel or in sequence depending on the arrangement. However each quantum signal will be different as it is determined at random. Each endpoint QKD device then discusses the signal exchanged with the central QKD device on a classical channel. This conveniently via the same fibre link 106 but at a different wavelength to the data traffic so it can directed appropriately by WDMs 216, 218. The result of the QKD exchange is a different quantum key established on each link known both to the relevant QKD endpoint device and the central QKD device.

The quantum key known by each endpoint QKD device is loaded into the local crypto unit. Meanwhile the central QKD device passes to first community key transmitter 206 all the quantum keys for endpoints in the first community. The first community key transmitter then generates a first community key and sends it to each endpoint in the community, encrypted using the relevant quantum keys. The first community key is thus sent to endpoint 214*a* using the quantum key established with endpoint 214*a* and to endpoint 214*b* using the different quantum key established with endpoint 214*b*. The community key may be sent as standard downstream data traffic with appropriate time division with other traffic or may be sent at a different wavelength. As first key transmitter 206 is only connected to the links to endpoints 214*a* and 214*b* there is no possibility of the first community key being sent to an endpoint in the second community in error. The central QKD device also passes to second community key transmitter 208 all the quantum keys for endpoints in the second community. The second community key transmitter then generates a second community key and sends it to each endpoint in the community, encrypted using the relevant quantum keys.

The crypto unit 210 at each endpoint is loaded with the quantum key established by the QKD device and hence is able to decrypt the community key. This may then replace to quantum key in the crypto unit for data traffic or the crypto unit may comprise separate cryptos for receipt of the community key and for standard data traffic.

In this way each endpoint receives a relevant community key. The relevant community keys can be used for end-to-end encryption between endpoints within a particular community.

Figure 3:
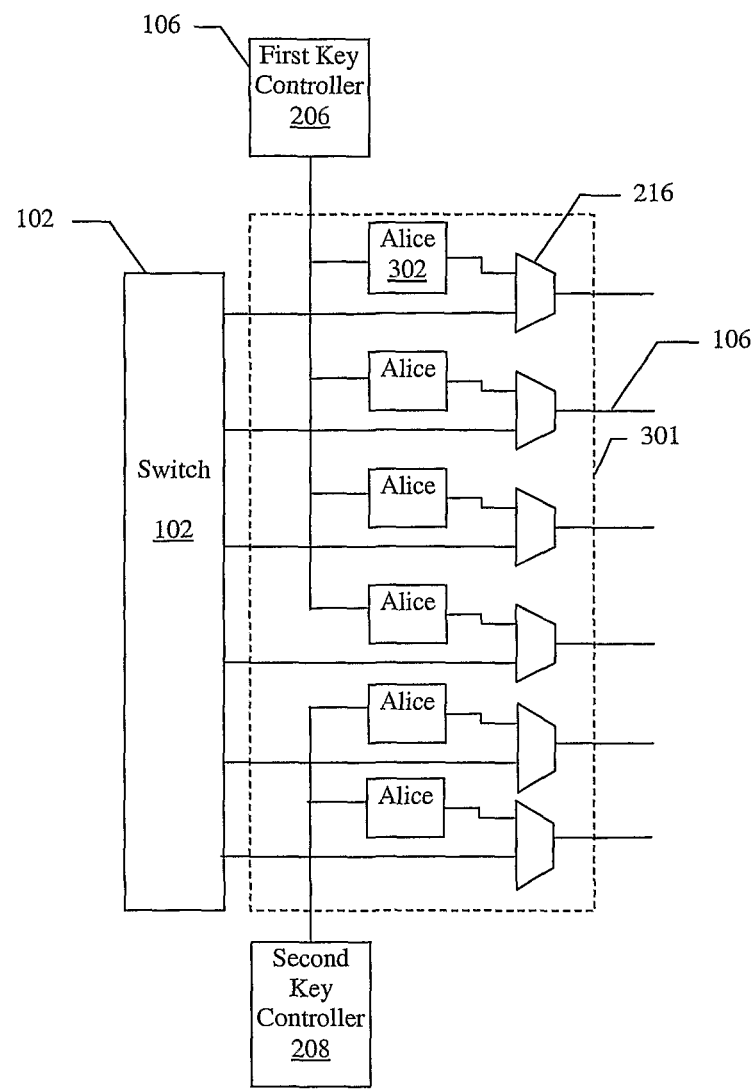
FIG. 3 shows a second embodiment of the central network architecture.

Whilst it is possible to have one QKD device at the central switch communicate with the QKD devices at the endpoints it may be preferable to have a separate QKD device, such as a QKD transmitter operating on each link such a shown in FIG. 3. FIG. 3 shows an array 301 of QKD transmitters 302, referred to as Alice units, with one Alice unit 302 arranged on each link 106. Each Alice 302 is connected to an appropriate key transmitter, i.e. first key transmitter/controller 206 or second key transmitter/controller 208. In this embodiment the key transmitters do not actually transmit the community key themselves. Instead the community key may be passed to the Alice unit and the classical transmitter within the Alice unit used to send to encrypted community key.

The invention claimed is:

1. A system to implement a switched optical star network having a plurality of distinct user communities, the network comprising:
   a hub and a plurality of endpoints optically connected to the hub;
   wherein the hub comprises a network switch and at least one quantum key distribution (QKD) device;
   each endpoint comprises a QKD device in optical communication with a QKD device at the hub, so as to, in use, derive a quantum key for that endpoint;
   the hub further comprises a separate key transmitter for each respective community, and each key transmitter is connected only to those endpoints which are within its respective community;
   each key transmitter is arranged to transmit only to endpoints within its respective community and is arranged to transmit to each endpoint within its respective community a community key encrypted using the quantum key for the particular endpoint;
   the hub mounted and endpoint QKD devices communicate on a quantum channel and a classical channel;
   the quantum and classical channels are established as different wavelengths transmitted over the same medium;
   the system to implement a switched optical star network further comprises a plurality of QKD devices at the hub; and
   each QKD device located at the hub is arranged to only communicate with endpoints within a single community.

2. A system to implement a switched optical star network as claimed in claim 1, wherein each key transmitter is arranged for downstream optical transmission with appropriate endpoints in its respective community.

3. A system to implement a switched optical star network as claimed in claim 1, wherein each key transmitter is physically secure.

4. A system to implement a switched optical star network as claimed in claim 1, wherein each hub mounted QKD device is physically secure.

5. A system to implement a switched optical star network as claimed in claim 1, wherein each QKD device mounted at an endpoint comprises a quantum channel receiver and each QKD device mounted at the hub comprises a quantum channel transmitter.

6. A system to implement a switched optical star network as claimed in claim 1, wherein each QKD device mounted at an endpoint comprises a quantum channel transmitter and each QKD device mounted at the hub comprises a quantum channel receiver.

7. A system to implement a switched optical star network as claimed in claim 1, further comprising at least one passive optical switch connecting a plurality of endpoints to the network switch.

8. A system to implement a switched optical star network as claimed in claim 1, wherein each key transmitter is arranged to conduct the classical communication part of the quantum key distribution with the endpoints in its respective community such that each key transmitter establishes the quantum keys with the endpoints in its respective community.

9. A system to implement a switched optical star network as claimed in claim 1, comprising a QKD device located at the hub for each optical link at the hub.

10. A system to implement a switched optical star network as claimed in claim 1, wherein each key transmitter comprises at least one classical communication apparatus arranged for downstream communication only.

11. A system to implement a switched optical star network as claimed in claim 10, comprising a separate classical communication apparatus for each optical link.

12. A system to implement a switched optical star network as claimed in claim 1, in which some or all of the classical communications involved in quantum key distribution, transmission of a community key and general network traffic are arranged to operate at different wavelengths.

13. An optical star network hub apparatus configured to provide multiple communities comprising:
   an optical network switch having a plurality of optical links for optical communication to endpoints;
   at least one quantum key distribution (QKD) device arranged to operate on said optical links and a separate key transmitter for each respective community;
   each key transmitter being connected to a different subset of the optical links such that it is only connected to those endpoints which are within its respective community; and
   each key transmitter being arranged to transmit a community key over said subset of optical links only to those endpoints which are within its respective community;
   wherein the community key is encrypted using a quantum key derived for that link by the QKD device;
   the hub mounted and endpoint QKD devices communicate on a quantum channel and a classical channel;
   the quantum and classical channels are established as different wavelengths transmitted over the same medium;
   the optical star network hub apparatus further comprises a plurality of QKD devices; and
   each QKD device located at the hub is arranged to only communicate with endpoints within a single community.

14. A method of operating a switched optical star network to provide different communities wherein the network comprises a plurality of endpoints, each endpoint being optically connected to a hub comprising an optical network switch, the method comprising the steps of:
   using quantum key distribution (QKD) between the hub and each endpoint to establish a quantum key for each endpoint;
   transmitting to each endpoint in a first community, from a first key controller at the hub, a first community key encrypted with the relevant quantum key for that endpoint; and
   transmitting to each endpoint in a second community, from a second key controller at the hub, a second community key encrypted with the relevant quantum key for that endpoint; wherein
   the first key controller is connected only to those endpoints which are within the first community and the second key controller is connected only to those endpoints which are within the second community;
   a plurality of hub mounted QKD devices and a plurality of endpoint QKD devices communicate on a quantum channel and a classical channel;
   the quantum and classical channels are established as different wavelengths transmitted over the same medium; and
   each QKD device located at the hub is arranged to only communicate with endpoints within a single community.

* * * * *